United States Patent [19]

Ohmi et al.

[11] Patent Number: 4,921,005
[45] Date of Patent: May 1, 1990

[54] MASS FLOW CONTROLLER

[76] Inventors: Tadahiro Ohmi, 2-1-17, Komegafukuro, Sendai-City Miyagi-Prefecture, 980, Japan; Hiroshi Mihira, 74-11, Takaba-cho, Mukaijima, Fushimi-ku, Kyoto, 612, Japan; Kiyoshi Satoh, 22-1, Terado-cho, Mukoh-City, Kyoto, 617, Japan

[21] Appl. No.: 366,618

[22] Filed: Jun. 15, 1989

[30] Foreign Application Priority Data

Jun. 20, 1988 [JP]  Japan ................. 63-152674

[51] Int. Cl.$^5$ .................. G01F 1/68; G01D 7/00
[52] U.S. Cl. .................. 137/486; 73/204.25
[58] Field of Search .......... 73/861.02, 204.22, 204.25, 73/204.27; 137/486, 487.5

[56] References Cited

U.S. PATENT DOCUMENTS

| | | | |
|---|---|---|---|
| 3,938,384 | 2/1976 | Blair | 73/204.22 |
| 4,487,213 | 12/1984 | Gates | 137/486 X |
| 4,517,838 | 5/1985 | Wachi | 73/204.22 |
| 4,519,246 | 5/1985 | Hartemink | 73/204.22 X |
| 4,695,034 | 9/1987 | Shimizu et al. | |

Primary Examiner—Alan Cohan
Attorney, Agent, or Firm—Price, Gess & Ubell

[57] ABSTRACT

A mass flow container wherein the resistive wires wound about the conduit of a flow meter portion are provided with a current in a direction such that the magnetic field produced by the current is opposite in direction to the flow of fluid through the conduit and wherein a flow rate-controlling portion includes a valve assembly that is mirror-finished.

6 Claims, 6 Drawing Sheets

MASS FLOW CONTROLLER

BACKGROUND OF THE INVENTION

1. Field of the Invention

The present invention relates to an improved mass flow controller comprising a mass flow meter portion for measuring a flow rate of the fluid and a fluid-controlling portion for controlling the flow rate of fluid provided between a fluid inlet and a fluid outlet formed in a base member.

2. Description of Related Art

In a fluid-controlling portion (control valve) of the conventional mass flow controller, as shown in, for example, FIG. 5, a valve seat 54 is provided between a fluid inlet 52 and a fluid outlet 53 which are formed in a base member 51. A valve body 55 having a pointed end portion 55A shaped like a frustum of cone is driven by means of, for example, a thermal type valve seat-driving portion 56 to suitably regulate the openness of a valve mouth 57 formed in said valve seat 54.

However, in the mass flow controller having the above-described construction, since the pointed end portion 55A of the valve body 55 has a frustum of conical shape, the pointed end portion 55A cannot be brought into close contact with a wall surface of the valve mouth 57 so that a fluid may not be leaked from the valve mouth 57. Accordingly, the control of remarkably small flow rates is limited, that is, the lower limit is at most about several percent of the largest controlled flow rate. For example, a minute flow rate, such as 0.1% of the largest controlled flow rate, could not be controlled.

Even if the mass flow controller can control a minute flow rate, if the noise level in the mass flow meter portion for measuring the flow rate of fluid is high, the minute flow rate cannot be controlled with high accuracy.

The mass flow meter portion of the conventional mass flow controller has been adapted to detect a mass flow rate of a fluid flowing through the conduit on the basis of a difference between electrical power required for holding two resistors wound around the conduit, through which the fluid is flown, independent of each other at appointed temperatures, respectively. With the conventional mass flow controller, the direction of the electrical current flowing through said resistors have not been clearly defined, so that an output signal having a high noise level, i.e., an output signal having a bad signal-to-noise ratio, could be obtained due to the mutual electromagnetic induction between the resistors. In order to reduce the noise until the noise level does not come into practical question as the mass flow controller, it is sufficient to provide a noise filter in a signal-treating portion, but this spoils the control response.

SUMMARY OF THE INVENTION

The present invention has been achieved paying attention to the above-described matters, and it is an object of the present invention to provide a mass flow controller capable of expanding the controllable range into the minute flow rate range and carrying out the high-speed control.

In order to achieve the above-described object, in the mass flow controller according to the present invention a flow rate-controlling portion of a flow rate-controlling member provided in a fluid-controlling portion is subjected to the mirror-finishing, and two resistors wound around a conduit in said mass flow meter portion are electrified so that the directions of magnetic fields generated in said two resistors may be opposite to the direction of a fluid flowing through said conduit.

With the above-described construction, since the flow rate-controlling portion of the flow rate-controlling member is subjected to the mirror-finishing, the minute flow rate can be controlled with high accuracy. Furthermore, since said respective resistors are electrified so that the directions of the magnetic fields generated in two resistors wound around the conduit in the mass flow meter portion may be opposite to the direction of the fluid flowing through said conduit, the output signal, which is not influenced by noises, can be obtained without using a noise filter, whereby the flow rate can be controlled with high-speed response, so that the above-described object can be completely achieved.

DESCRIPTION OF THE PREFERRED EMBODIMENTS

Figure 1:
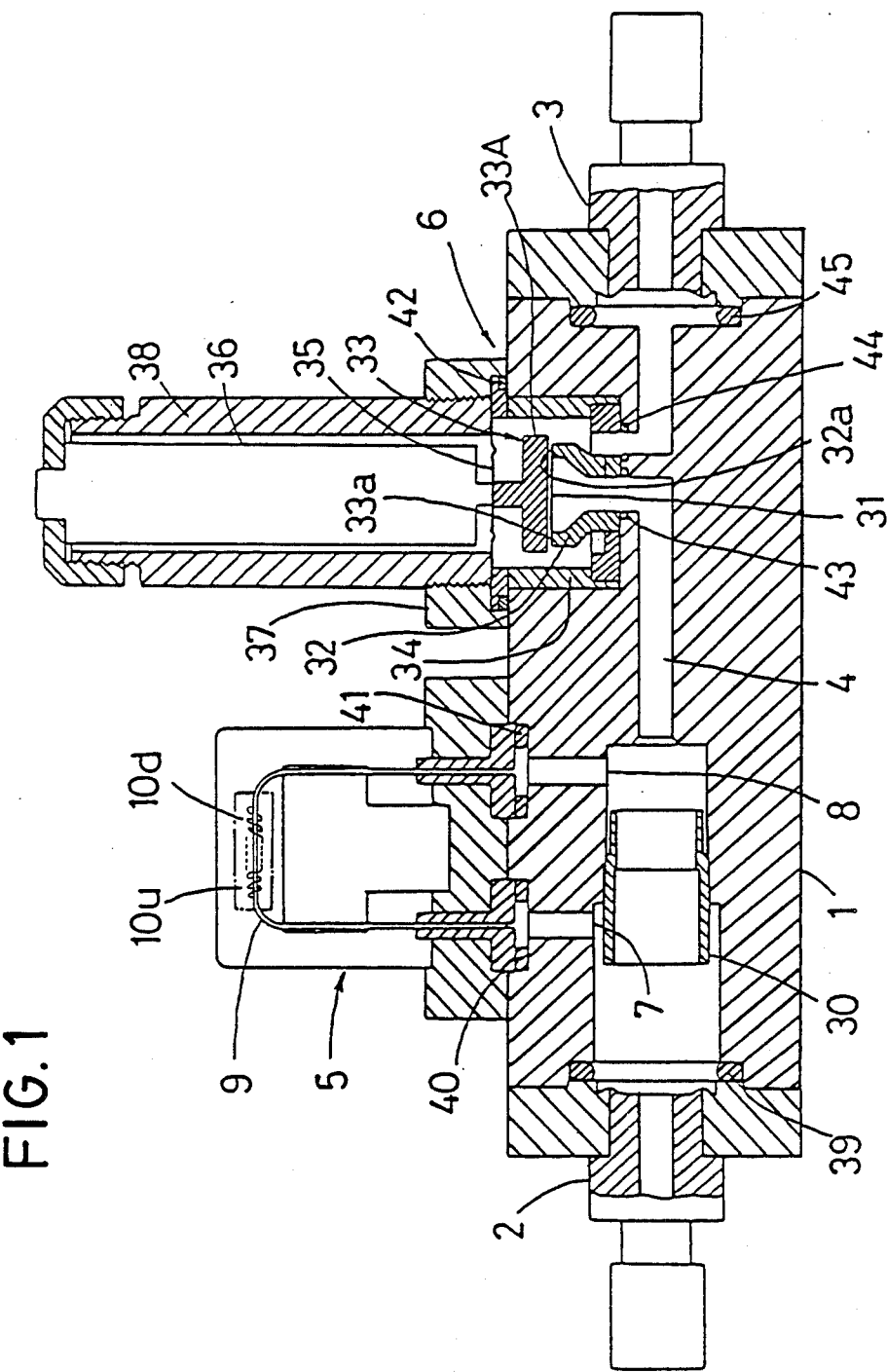
FIG. 1 is a longitudinal sectional view showing a mass flow controller according to one preferred embodiment of the present invention.

One preferred embodiment of the present invention will be described below with reference to the drawings, in which:

FIG. 1 shows one example of a so-called normal open-type mass flow controller. Referring now to FIG. 1, reference numeral 1 designates a base member, reference numerals 2 and 3 designate a fluid inlet and a fluid outlet formed in said base member 1, respectively. Reference numeral 4 designates a fluid passage formed between said fluid inlet 2 and said fluid outlet 3, said fluid passage 4 being provided with a mass flow meter portion 5 and a fluid-controlling portion 6. In addition, although the mass flow meter portion 5 is provided on the upstream side of the fluid-controlling portion 6 in the preferred embodiment shown, this arrangement may be reversed.

Said mass flow meter portion 5 comprises resistors 10$u$, 10$d$ (hereinafter referred to as a first resistor 10$u$ and a second resistor 10$d$) composed of, for example, a thermal mass flow rate sensor wound around a conduit 9 formed of, for example, a thin-walled capillary tube connecting a sample passage inlet 7 to a sample passage outlet 8, said sample passage inlet 7 and said sample passage outlet 8 being opened so as to face the fluid passage 4.

Figure 2:
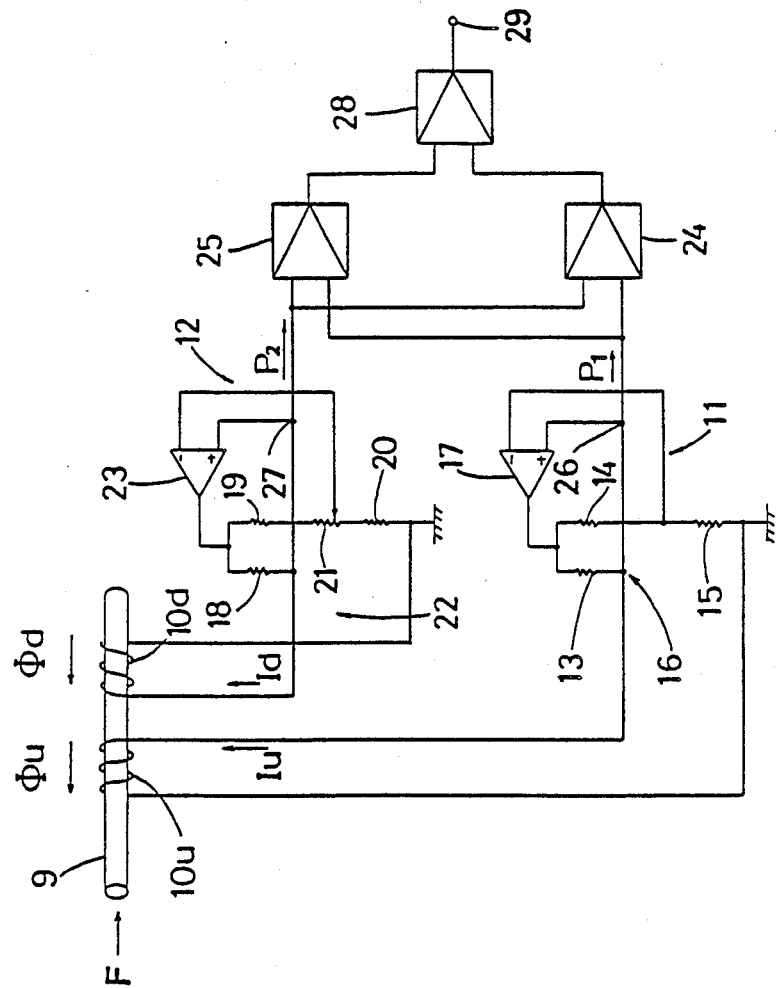
FIG. 2 is a block diagram showing one example of a circuit for supplying resistors with an electrical power.

FIG. 2 shows one example in which the first resistor 10$u$ and the second resistor 10$d$ are wound around the circuit 9, through which the fluid F flows, in the directions opposite to each other and independent of each other. Also shown in FIG. 2 is a circuit for supplying said first resistor 10$u$ and second resistor 10$d$ with an electrical current. The first resistor 10$u$ and the second resistor 10$d$ are formed of a temperature-sensitive resistance wire made of, for example, iron-nickel alloys having a large temperature coefficient to detect the slightest change in the flow rate of the fluid F flowing through the conduit 9.

Reference numerals 11 and 12 designate constant-temperature control circuits (hereinafter referred to as a first constant-temperature control circuit 11 and a second constant-temperature control circuit 12) including the first resistor $10u$ and the second resistor $10d$ as a constituent element of bridge circuits 16, 22, which will be mentioned later, respectively. Said first constant-temperature control circuit 11 and said second constant-temperature control circuit 12 are comprised of the same parts and are controlled so that a temperature of the first resistor $10u$ may be always equal to that of the second resistor $10d$ at the appointed temperature.

The first constant-temperature control circuit 11 comprises a bridge circuit 16 consisting of the first resistor $10u$, a temperature-setting resistance 13 of the first resistor $10u$ and bridges 14, 15 and a control circuit 17. In addition, the second constant-temperature control circuit 12 comprises a bridge circuit 22 consisting of the second resistor $10d$, a temperature-setting resistance 18 of the second resistor $10d$, bridge resistances 19, 20, and a variable resistance 21 and a control circuit 23. The variable resistance 21 is regulated so that outputs of the bridge circuits 16, 22 may be calibrated to equal each other when the flow rate of the fluid F flowing into the conduit 9 is zero. The temperature-coefficients of the resistances 13, 14, 15, 18, 19, 20, and 21 are sufficiently small in comparison with those of the first resistor $10u$ and the second resistor $10d$.

Figure 3A:
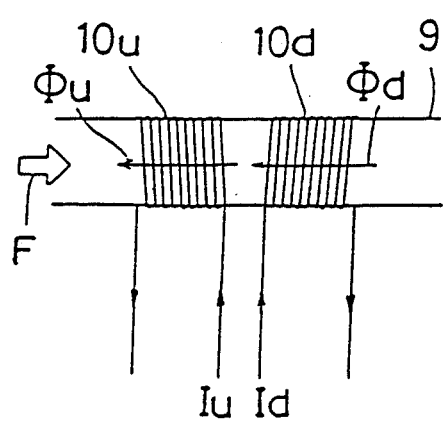
FIGS. 3(A) to 3(D) are diagrams showing the direction of fluid flowing through a conduit, the direction of electrical current supplied to two resistors, and the direction of the magnetic fields generated in the respective resistors by said electrical current.

The above-described first resistor $10u$ and second resistor $10d$ are connected to said first constant-temperature control circuit 11 and said second constant-temperature control circuit 12 so that the directions of magnetic fields $\phi_u$, $\phi_d$ generated in the first resistor $10u$ and the second resistor $10d$ by the flow of electrical currents $I_u$, $I_d$ supplied by the first constant-temperature control circuit 11 and the second constant-temperature control circuit 12, respectively, may be opposite to the direction of the fluid F flowing through the conduit 9 [refer to FIG. 3(A)].

Reference numerals 24, 25 designate an adding circuit and a subtracting circuit, respectively. An added output $P_l + P_2$ is output from the adding circuit 24 and a subtracted output $P_l - P_2$ is output from the subtracting circuit 25 when an electrical potential $P_1$, $P_2$ is present at output points 26, 27 of the bridge circuits 16, 22 as inputs, respectively. Reference numeral 28 designates a dividing circuit that outputs $(P_1 - P_2)/(P_1 + P_2)$ when the outputs from the adding circuit 24 and the subtracting circuit 25 are presented as inputs. Since this output $(P_l - P_2)/(P_1 + P_2)$ is proportional to the mass flow rate of the fluid F flowing through the conduit 9, the mass flow rate can be obtained by multiplying said output by a suitable constant. Finally, reference numeral 29 designates an output terminal.

Referring again to FIG. 1, reference numeral 30 designates a bypass portion having constant flow-dividing ratio characteristics formed in the fluid passage.

Said fluid-controlling portion 6 has the following construction: The fluid passage 4 is provided with a valve seat 32 having a valve mouth 31 and a valve body 33 for regulating the openness of the valve mouth 31 on the downstream side of said bypass portion 30 under the condition that a valve head 33A of the valve body 33 is close to the valve mouth 31. This valve body 33 is supported by means of a metallic diaphragm 35 so as to be movable in the up and down direction within a valve body guide portion 34. Furthermore, said metallic diaphragm 35 biases said valve body 33 so as to form some gap between it and the valve seat 32.

The opposing portions of said valve seat 32 and valve body 33 (these are generally collectively called the flow rate-controlling member), i.e., flow rate-controlling portions 32a, 33a, are subjected to mirror-finishing so as to form a remarkably flat plane ($R_{max}$ of 0.5 microns or less).

Reference numeral 36 designates a valve body-driving portion (actuator) for driving the valve body 33 in the appointed direction which comprises a piezostack formed of a plurality of, for example, laminated piezoelements. This valve body-driving portion 36 is housed in a cylindrical cover member 38 screwed on a valve block 37, and an output portion thereof is displaced downward by applying an appointed direct current voltage thereto to descend the valve body 33, whereby the openness of the valve mouth 31 is changed.

In addition, referring to FIG. 1, reference numerals 39 to 45 designate O-rings made of stainless steel as sealing members.

In the mass flow controller having the above-described construction, the flow rate-controlling portions 32a, 33a of the flow rate-controlling members 32, 33 are subjected to the mirror-finishing, so that the openness of the valve mouth 31 can be regulated to the order of between microns and submicrons and thus, is capable of obtaining a very high controlling resolution power that so that a remarkably small flow rate can be controlled with high accuracy.

Figure 4A:
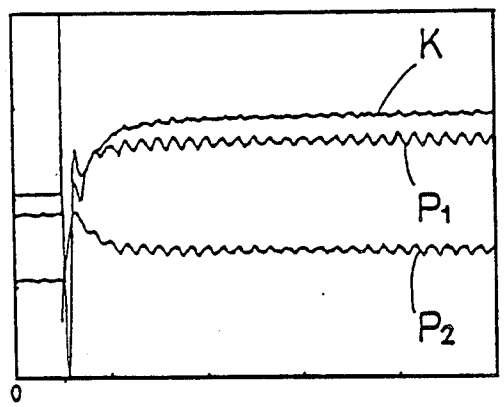
FIGS. 4(A) to 4(D) are output shape diagrams.

Since the resistors $10u$, $10d$ are electrified so that the directions of the magnetic fields $\phi_u$, $\phi_d$ generated in the resistors $10u$, $10d$ wound around the conduit 9 may be opposite to the direction of the fluid F flowing through the conduit 9, an output signal K having a remarkably low noise level can be obtained, as shown in FIG. 4(A). Accordingly, an output having a reduced voltage fluctuation and a remarkably low noise level can be obtained without using any noise filters, so that the small flow rates can also be controlled with high-speed response.

Figure 3B:
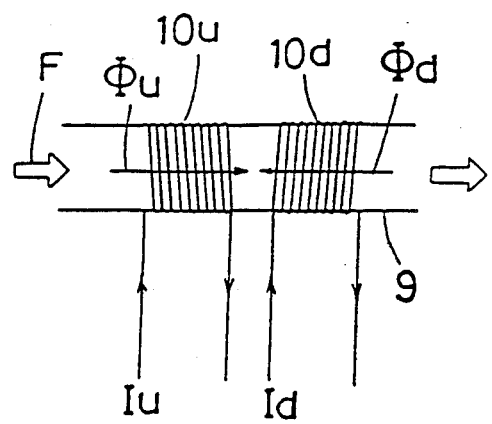
Figure 3C:
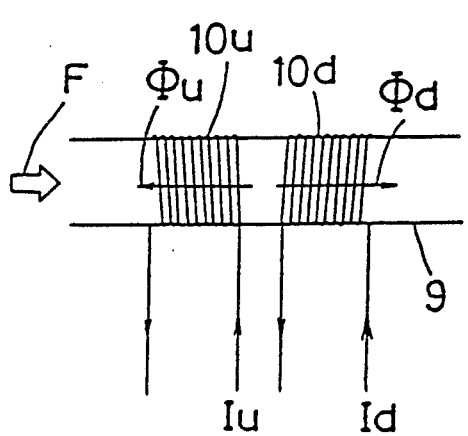
Figure 3D:
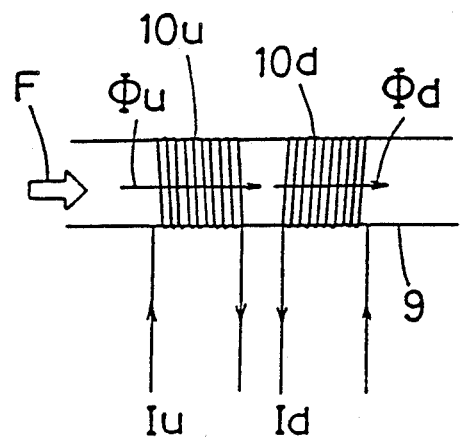
Figure 4B:
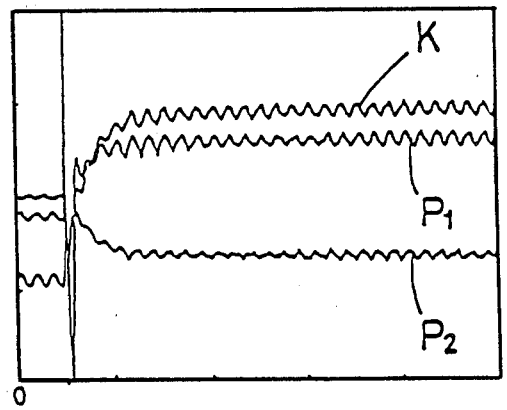
Figure 4C:
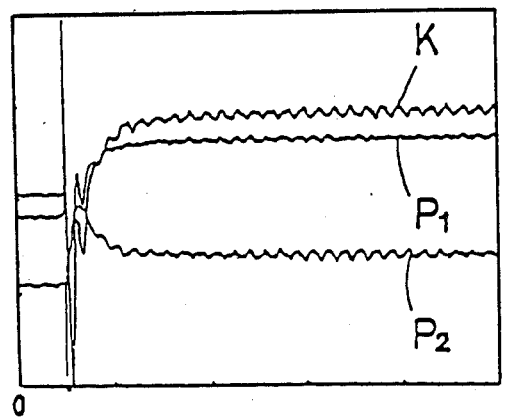
Figure 4D:
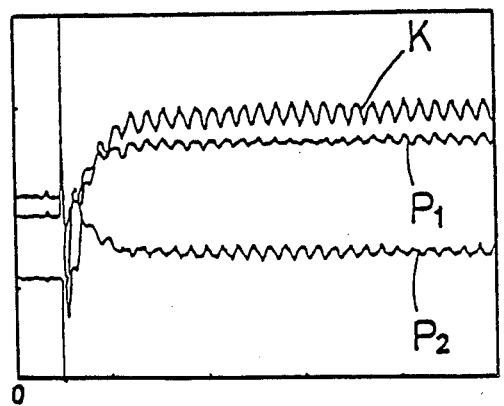
Figure 5:
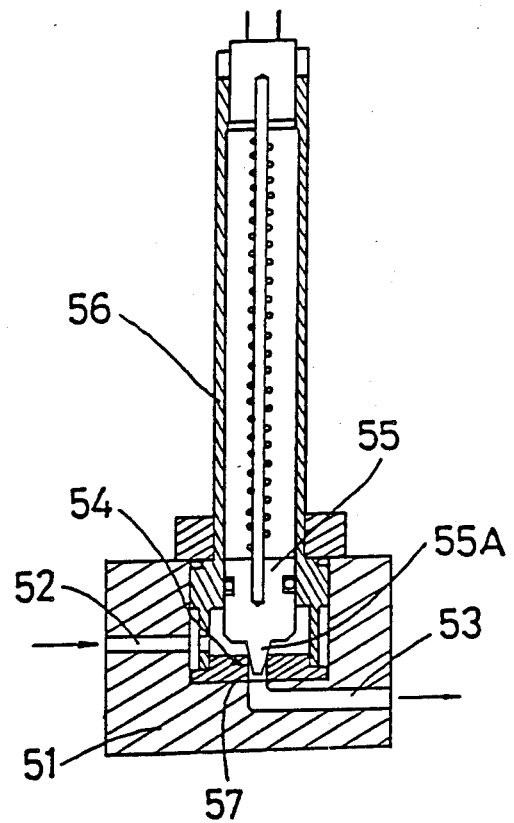
FIG. 5 is a sectional view describing the prior art.

Referring to FIGS. 3(A) to 3(D), the direction of the electrical currents $I_u, I_d$ supplied to the two resistors $10u$, $10d$, the directions of the magnetic fields $\phi_u$, $\phi_d$ generated in the respective resistors $10u$, $10d$ by said electrical currents $I_u$, $I_d$, and the direction of the fluid F flowing through the conduit 9 are shown, in which FIGS. 3(B) to 3(D) shows COMPARATIVE EXAMPLES. In addition, the wave shapes of the output signals in the respective cases of said FIGS. 3(A) to 3(D) are shown in FIGS. 4(A) to 4(D), in which FIGS. 4(B) to 4(D) shows COMPARATIVE EXAMPLES. It can be seen from FIGS. 3 and 4 that the noise level is remarkably high in COMPARATIVE EXAMPLES.

The scope of the present invention is not limited by the above-described preferred embodiment. For example, the resistors $10u$, $10d$ may be wound around the conduit 9 in directions other than those shown in the above-described drawings. In addition, the valve body-driving portion 36 can be composed of various kinds, such as a thermal driving type. Furthermore, the present invention can also be applied to the normal close type mass flow controller.

In the above-described mass flow controller according to the present invention, the flow rate-controlling portions of the flow rate-controlling members provided in the fluid-controlling portion are subjected to mirror-finishing, and said respective resistors are electrified so that the directions of the magnetic fields generated in the resistors wound around the conduit in said mass flow meter portion may be opposite to the direction of the fluid flowing on said conduit, so that the minute flow rates, such as a minute flow rate that is 0.1% of the largest controlled flow rate, can be controlled with high accuracy and with high-speed response.

What is claimed is:

1. An improved mass flow controller having a mass flow meter portion for measuring the flow rate of a fluid provided between a fluid inlet and a fluid outlet and further having a fluid-controlling portion for controlling the flow rate of the fluid, the improvement comprising:

said mass flow meter portion having a fluid conduit with two resistors being wound about said fluid conduit, said resistors forming part of a measuring circuit means and said measuring circuit means supplying said two resistors with an electric current such that the direction of the magnetic field generated in said two resistors is opposite to the direction of the fluid flowing through said conduit.

2. The improved mass flow controller of claim 1 wherein said fluid-controlling portion comprises a fluid controlling valve having a valve seat and a valve mouth, said valve seat and said valve mouth having substantially planar surfaces, the planar surface of said valve seat movably opposing the planar surface of said valve mouth, and said planar surfaces being mirror-finished whereby said fluid-controlling portion may provide a very low flow rate at very high accuracy.

3. A mass flow controller comprising:
   a base member having a fluid inlet, a fluid outlet, and a fluid passage therebetween;
   a fluid-controlling means;
   a mass flow meter portion including a fluid conduit with two resistive wires being wound about said fluid conduit so as to form two coils, said resistive wires forming part of a measuring circuit means and said measuring circuit means supplying said two resistive wires with an electric current such that the direction of the magnetic field generated in the coils formed by said two resistive wires is opposite to the direction of the fluid flowing through said conduit.

4. The mass flow controller of claim 3 wherein said fluid-controlling means is comprised of a fluid controlling valve having a valve seat and a valve mouth, said valve seat and said valve mouth having substantially planar surfaces, the planar surface of said valve mouth movably opposing the planar surface of said valve mouth, said planar surfaces being mirror-finished whereby said fluid-controlling portion may provide a very low flow rate at very high accuracy.

5. A mass flow controller comprising a mass flow meter portion for measuring the flow rate of a fluid and a fluid-controlling portion for controlling the flow rate of the fluid, said fluid provided between a fluid inlet and a fluid outlet formed in a base member, characterized by a flow rate-controlling portion of a flow rate-controlling member provided in said fluid-controlling portion being subjected to a mirror-finishing, and two resistors wound around a conduit in said mass flow meter portion being electrified so that the direction of magnetic fields generated in said two resistors is opposite to the direction of a fluid flowing through said conduit.

6. An improved mass flow controller having a mass flow meter portion for measuring the flow rate of a fluid and a fluid-controlling portion for controlling the flow rate of the fluid, said fluid proveded between a fluid inlet and a fluid outlet formed in a base member, the improvement comprising:
   a flow rate-controlling portion of a flow rate-controlling member provided in said fluid-controlling portion being subjected to a mirror-finishing; and
   two resistive wires that form part of a measuring circuit wound around a measuring conduit in said mass flow meter portion, said wires being provided with an electric current in a direction such that the direction of the magnetic fields generated by said current is opposite to the direction of a fluid flowing through said measuring conduit.

* * * * *